US006729538B2

(12) United States Patent
Farquhar

(10) Patent No.: US 6,729,538 B2
(45) Date of Patent: May 4, 2004

(54) CARD READER MODULE

(75) Inventor: Stiven A. Farquhar, Dundee (GB)

(73) Assignee: NCR Corporation, Dayton, OH (US)

( * ) Notice: Subject to any disclaimer, the term of this patent is extended or adjusted under 35 U.S.C. 154(b) by 111 days.

(21) Appl. No.: 09/943,160

(22) Filed: Aug. 30, 2001

(65) Prior Publication Data

US 2002/0030109 A1 Mar. 14, 2002

(30) Foreign Application Priority Data

Sep. 12, 2000 (GB) .............................................. 0022247

(51) Int. Cl.[7] .............................................. G06F 17/60
(52) U.S. Cl. ...................... 235/379; 235/380; 235/383; 235/475; 235/477; 235/479
(58) Field of Search ................. 235/379, 380, 235/383, 475, 477, 479

(56) References Cited

U.S. PATENT DOCUMENTS

| | | | | | |
|---|---|---|---|---|---|
| 4,581,523 A | * | 4/1986 | Okuno | ........................ | 235/479 |
| 4,591,937 A | * | 5/1986 | Nakarai et al. | ............. | 360/101 |
| 5,463,678 A | * | 10/1995 | Kepley et al. | ......... | 379/144.04 |
| 5,850,079 A | * | 12/1998 | Ohwa et al. | ................. | 235/475 |
| 5,949,047 A | * | 9/1999 | Abe et al. | .................... | 235/435 |
| 5,984,179 A | * | 11/1999 | May | ........................... | 235/379 |
| 6,196,463 B1 | * | 3/2001 | Ferry | .......................... | 235/475 |
| 6,446,872 B1 | * | 9/2002 | Imai et al. | .................. | 235/475 |

FOREIGN PATENT DOCUMENTS

| | | | | |
|---|---|---|---|---|
| FR | 2554262 A1 | * | 5/1985 | ............ G06K/7/06 |
| WO | WO 95/29459 | | 11/1995 | |

* cited by examiner

*Primary Examiner*—Michael G. Lee
*Assistant Examiner*—Steven S. Paik
(74) *Attorney, Agent, or Firm*—Michael Chan

(57) ABSTRACT

A motorized card reader module (10) having a throat portion (14) defining an entry/exit slot (16) for receiving cards (78) is described. The module (10) includes a sweeping mechanism (28) comprising one or more arms (62) coupled to a driving mechanism (64, 66). The arms (62) include a hook portion (68) for catching any obstruction present in the throat portion (14). When the driving mechanism (64,66) is energized the arms (62) sweep horizontally across the slot (16) defined by the throat portion (14). This enables the arms (62) to detect and/or remove any obstruction within the throat portion (14). A self-service terminal (80) for preventing fraud and a method of preventing fraud using the module (10) are also described.

13 Claims, 10 Drawing Sheets

CARD READER MODULE

BACKGROUND OF THE INVENTION

The present invention relates to a card reader module, particularly a motorized card reader module, for resisting fraud. The invention is particularly related to preventing fraud at a self-service terminal (SST), such as an ATM (automated teller machine), a point of sale (PoS) terminal, or any other terminal using a motorized card reader module. The invention also relates to an SST including such a card reader module.

ATMs typically store large amounts of cash. This makes them vulnerable to attack by thieves. To combat physical attack, ATMs include a safe for storing the cash. However, ATMs are also vulnerable to attack by fraud.

One type of fraud involves a third party placing a loop of thin, strong, material over a card entry slot in the ATM. The material is so thin that it may not be noticed by an unwary user of the ATM. The material is designed so that:

(1) it prevents a user's card from fully entering a motorized card reader module located behind the card entry slot, and (2) it prevents the entered user's card from being ejected from the motorized card reader module.

Thus, the design of this material causes an entered card to jam in the module so that the module cannot draw in or eject the card. When this happens, the user generally assumes that the ATM has gone out of service and goes away from the ATM, leaving his/her card jammed in the card reader module.

The third party can then extract the card from the card reader module, remove the thin material, and (if the third party has observed or otherwise obtained the user's PIN) use the card to withdraw cash from the ATM.

SUMMARY OF THE INVENTION

It is an object of an embodiment of the present invention to reduce the possibility of this type of fraud.

According to a first aspect of the invention there is provided a motorized card reader module having a throat portion for receiving cards, characterized in that the module includes an arm for traversing the throat portion to detect any obstruction within the throat portion.

Preferably, the arm traverses generally horizontally from one side of the throat to an opposite side of the throat, so that the arm traverses a substantial part of the width of the throat portion. Alternatively, but less preferably, the arm may traverse generally vertically from one side of the throat to an opposite side of the throat, so that the arm traverses the height of the throat portion.

The arm may not be in contact with the throat portion at any time, and is preferably located to the rear of, but in proximity to, the throat portion.

By virtue of this aspect of the invention the card reader module is able to detect the presence of unauthorized material in the card reader throat because the unauthorized material would prevent traversal of the arm.

Preferably, the arm includes a hook portion on a leading edge. The hook portion enables the arm to catch any thin material and drag it to a side of the throat portion as the arm traverses the throat portion.

Preferably, the arm includes a cutting mechanism for cutting any unauthorized material placed in the throat of the card reader. This has the advantage that any unauthorized material may be removed by traversal of the arm, thereby ensuring that the card reader does not need to be inactivated.

The cutting mechanism may be located in the hook portion.

The cutting mechanism may be a single blade, a pair of co-operating blades, or any other convenient arrangement.

Preferably, the card reader includes a sensor for detecting when the arm is located at one end of the throat. This may be used to detect the arm prior to the arm traversing the throat, and once the arm has returned after traversing the throat. If the arm fails to return, the module activates an alert so that the card reader may be disabled to prevent a user inserting a card.

Preferably, the card reader includes another sensor for detecting when the arm is located at an opposite end of the throat to the first sensor. By using two sensors, it is possible to detect the arm at each side of the throat portion. This enables a single traverse of the throat portion to be used, which reduces the time required to detect an obstruction.

Preferably, the sensor or sensors are located to detect any cutting mechanism that is present on the arm, so that if the cutting mechanism is damaged (intentionally or otherwise) the sensor or sensors can detect this.

The arm may be operable to perform a traverse of the throat portion each time a user inserts a card to be read. The card reader may eject the card by a small amount (such as by 1 or 2 cm) prior to the arm traversing the throat portion, so that a small part of the card protrudes from the card reader module. The advantage of ejecting the card by a small amount is that if the traverse of the throat portion detects an obstruction that cannot be removed or otherwise inactivated, the user may be asked to remove his/her card from the card reader module. As the card is ejected by a small amount, the user is able to grip the card to remove it. If the card was ejected by a large amount (4 or 5 cm) then a user may be confused and may remove the card during the traverse of the throat portion.

Preferably, the card reader is operable to activate the arm at periodic intervals (for example, every hour) when no card is present. Preferably, the card reader is operable to activate the arm on entry of a card into the card reader. Preferably, the card reader is also operable to activate the arm on ejection of a card from the card reader.

Preferably, the hook portion is resiliently biased so that the hook portion may be deflected by, but remain in contact with, any card present in the throat portion as the arm traverses the throat portion.

The motorized card reader module may be a magnetic card reader, a Smart card reader, a combined Smart card and magnetic card reader, or such like. The motorized card reader module may also be able to write to any card inserted therein (that is, it may be a motorized card reader/writer module).

Preferably, the module includes a sweeping mechanism comprising one or more arms coupled to a driving mechanism, so that the sweeping mechanism is able to activate the driving mechanism to cause the one or more arms to traverse the throat portion. The driving mechanism may be implemented by a linear gear train and motor, or any other convenient mechanism.

Preferably, two arms are used that are driven in opposite directions so that they traverse the throat portion in opposite directions.

In one embodiment, the two arms are located near a central part of the throat portion, and pass each other as they traverse the throat portion.

According to a second aspect of the present invention there is provided a self-service terminal comprising a fascia defining a card entry slot, and a motorized card reader module having a throat portion for receiving cards, characterized in that the module includes an arm for traversing the throat portion to detect any obstruction within the throat.

The terminal may be an ATM.

The module may activate an alarm on detecting that an unauthorized material is present that cannot be removed or cut. This alarm may be audible or visual, and may be relayed automatically to an appropriate person, for example to a person authorized to service the terminal.

According to a third aspect of the present invention there is provided a method of preventing fraud, the method comprising the steps of: providing an arm for traversing a throat portion of a card reader module; driving the arm to traverse the throat portion; and, in response to detection of a failure of the arm to traverse the throat portion correctly, activating an alert signal.

The module may disable itself on activation of an alert signal. Alternatively, the module may await receipt of a disable signal before it disables itself.

The step of driving the arm to traverse the throat portion may include the sub-steps of driving the arm prior to insertion of a card, during insertion of a card, and on ejection of a card.

The method may include the further step of informing an authorized person (such as a call center representative, a service engineer, or such like) of the card reader being disabled.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
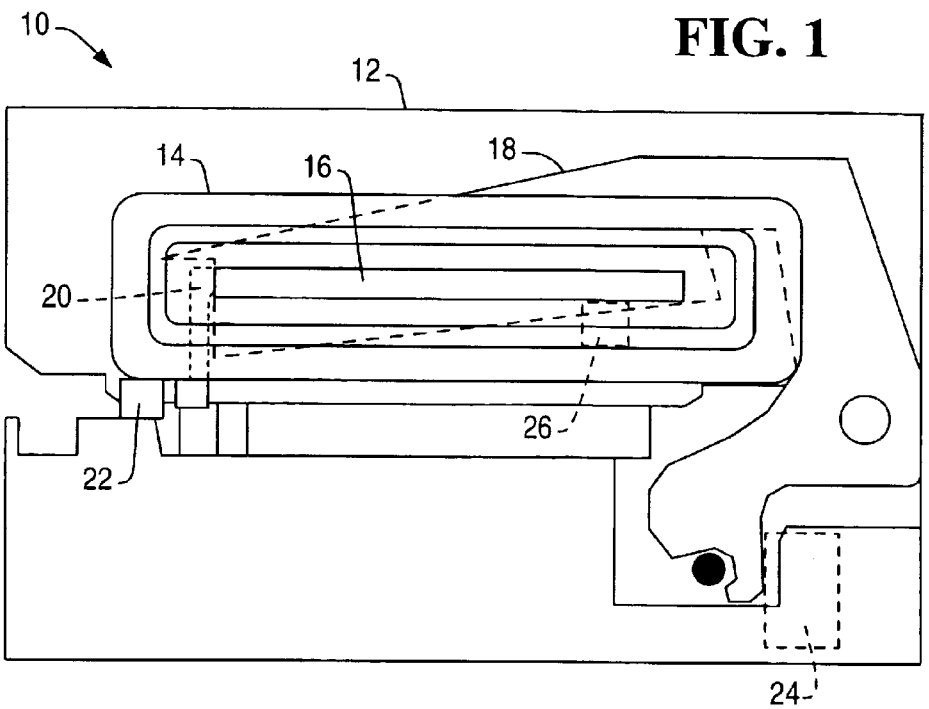
FIG. 1 is a schematic front view of a motorized card reader module according to an embodiment of the present invention.
Figure 2:
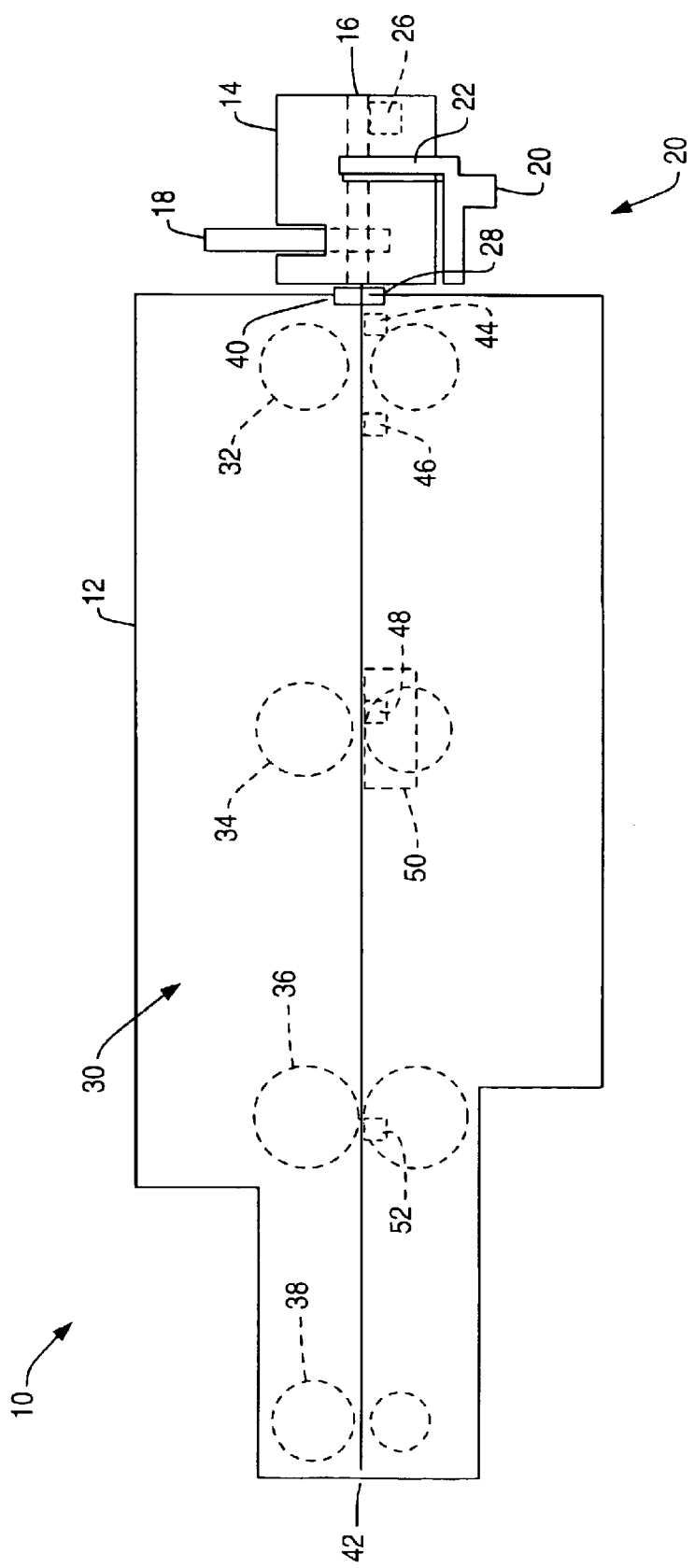
FIG. 2 is a simplified schematic side view of the module of FIG. 1.

Reference is now made to FIGS. 1 and 2, which are front and side schematic views respectively of a motorized card reader/writer (MCRW) module 10.

The module 10 is a modified version of a conventional MCRW module made by Sankyo (trade mark) and available from Sankyo at 1-17-2, SHINBASHI, MINATO-KU, TOKYO, 1058633, Japan.

Module 10 comprises a housing 12 coupled to a throat portion 14 and is suitable for reading a standard size magnetic stripe card.

The throat portion 14 defines a slot 16 into which a magnetic stripe card may be inserted, and includes a shutter 18 pivotally coupled to the housing 12. With the shutter 18 in the open position, a card may be conveyed between the housing 12 and the throat portion 14; whereas, with the shutter 18 in the closed position no card may pass between the throat portion 14 and the housing 12. When the leading edge of a card passes beneath the shutter 18, the shutter 18 is biased against the top of the card so that the shutter 18 automatically closes once the trailing edge of the card clears the shutter 18.

The throat portion 14 includes a card width switch 20 having an elongated arm 22 that is pivotally mounted to the throat portion 14.

If a user inserts a conventional magnetic stripe card into the throat portion 14 then the arm 22 is deflected and switch 20 detects the deflection of the arm 22, which indicates the presence of the card.

The housing 12 includes a shutter detect sensor 24 for detecting whether the shutter 18 is in an open or closed position.

The throat portion 14 also includes a magnetic head in the form of a read/write head 26. Magnetic head 26 is used to detect that a magnetic stripe is present on a card being inserted. If no magnetic stripe is detected then the shutter 18 will not be opened, even if the arm 22 is deflected. Thus, shutter 18 will only be opened if a card is entered that has (1) the correct width (as detected by switch 20), and (2) a magnetic stripe in the correct location (as detected by read/write head 26).

Thus, if a magnetic stripe card is inserted in a wrong orientation the shutter 18 will not open.

Referring particularly to FIG. 2, a sweeping mechanism 28 is located between the housing 12 and the throat portion 14, this is described in more detail below, with reference to FIGS. 3a and 3b.

In FIG. 2, the housing 12 also includes a linear transport mechanism, shown generally by arrow 30, comprising four pairs of rollers 32,34,36,38 and associated stretchable endless toothed belts (not shown) for transporting a card when it is within the housing 12.

The housing 12 defines an entrance/exit slot 40 (in registration with the slot 16) at one end and a card retention/capture slot 42 at the opposite end. When a card is inserted by a user, the first pair of rollers 32 pinch the leading edge of the card and draw the card into the housing 12. When the trailing edge of the card clears the shutter 18, the shutter 18 closes thereby capturing the card within the housing 12, and the card reading operation begins.

The housing 12 includes four position sensors for accurately locating the position of the card within the housing 12.

A card present sensor 44 is located in the vicinity of the throat portion 14 at the first pair of rollers 32. The sensor 44 is in the form of an optical sensor for detecting the presence of a card inserted into the housing 12.

A card eject sensor 46 is located a predetermined distance from the throat portion 14 to ensure that on ejection of a card the card protrudes from the throat portion 14 by a sufficient distance to allow a user to grip and remove the card.

A card detect sensor 48 is located at the second pair of rollers 34 in the vicinity of a card read/write head 50 so that when the leading edge of a card is detected, the magnetic stripe on the card may be read by the card read head 50.

A card stop sensor 52 is located distal from the throat portion 14 at the third pair of rollers 36. The card stop sensor 52 is spaced from the card read sensor 48 by a distance less than the length of a standard card, so that when the card stop sensor 52 detects the leading edge of a card, the card is still in contact with the card read sensor 48.

The card is only transported beyond the card stop sensor 52 if the card is to be conveyed out of the retention slot 42 and retained by the card reader module 10. Where the module 10 is used in an ATM, this may occur because a user has inserted the wrong PIN on a predetermined number of occasions, or because the card is registered as stolen.

The four sensors 44,46,48,52 are located so that once a card enters the housing 12 it can always be located by at least one of the sensors 44,46,48,52, unless the card is conveyed out of the retention slot 42.

Figure 3A:
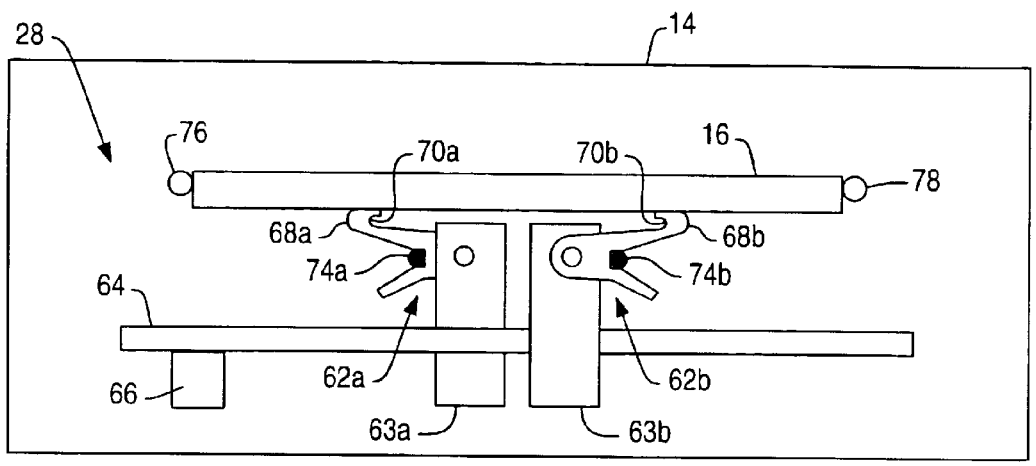
FIGS. 3a and 3b are simplified schematic rear and plan views respectively of part of the module of FIG. 2.
Figure 3B:
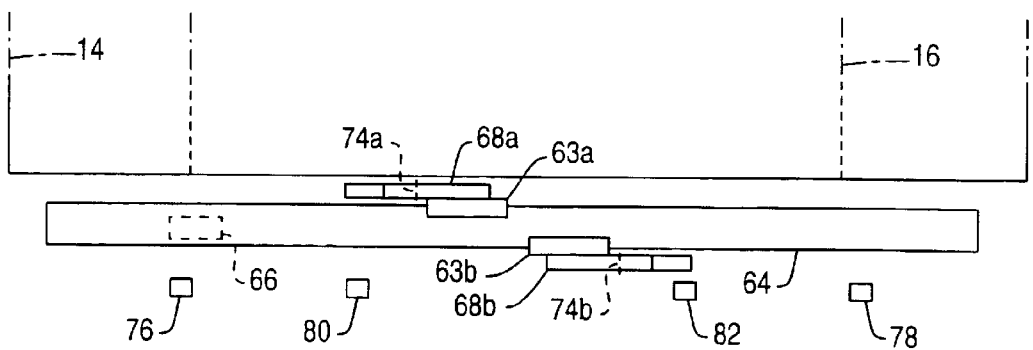

FIGS. 3a and 3b show the sweeping mechanism 28 in more detail. FIG. 3a is a simplified rear view of the mechanism 28 and throat portion 14.

The sweeping mechanism 28 comprises two arms 62a,b mounted on opposite sides of a driving mechanism in the form of a linear gear train 64 driven by a motor 66.

Each arm 62a,b comprises a body 63a,b having a hook portion 68a,b pivotally coupled thereto. The two hook portions 68a,b are very similar, but mounted in opposing orientations. The hook portions 68 are shown in more detail in FIGS. 4a and 4b.

Each hook portion 68 is coupled to its respective arm body 63 by a pivot that includes a spring 69 for biasing the hook portion 68 upwards so that the top of the hook portion 68 is biased towards the top of the slot 16. A cutting blade 70 is located near the top of the hook portion 68, and faces one direction. An upper cam surface 71 and a lower cam surface 72 are defined by the hook portion 68 and face the opposite direction to the blade 70. The upper and lower cam surfaces 71,72 meet to form a pin retention slot 73. A low friction, non-scratch material 75 is provided on an upper surface of the hook portion 68. The material 75 is selected so that it will not damage a card as it slides across the card surface.

In FIGS. 3 and 4, the hook portions 68 are shown in the inactive position near the center of the throat portion 14. In the inactive position, each pin retention slot 73a,b engages with a pin 74a,b, which ensures that the top of the hook portion 68 does not protrude above the lower part of the slot 16, as shown in FIG. 3a.

The arms 62 are simultaneously driven in opposite directions by the gear train 64, and are arranged and dimensioned so that each arm 62 can pass the other without any contact between the oppositely moving arms 62 (best seen in FIG. 3b, which is a plan view). The direction of traverse of each arm 62 can be changed by reversing the rotation of the motor 66.

Four sensors 76,78,80,82 are associated with the sweeping mechanism 28 for detecting the arms 62. Two of the sensors 76, 78 are located on opposite sides of the slot 16 to detect the top of the hook portion 68 of the arms 62. This enables the mechanism 28 to check that the hook portions 68 have not been broken, bent, or otherwise damaged. The other two sensors 80,82 are located to detect the top of the hook portion 68 of the arms 62 when in the inactive position (for clarity, sensors 80 and 82 are only shown in FIG. 3b).

Figure 5:
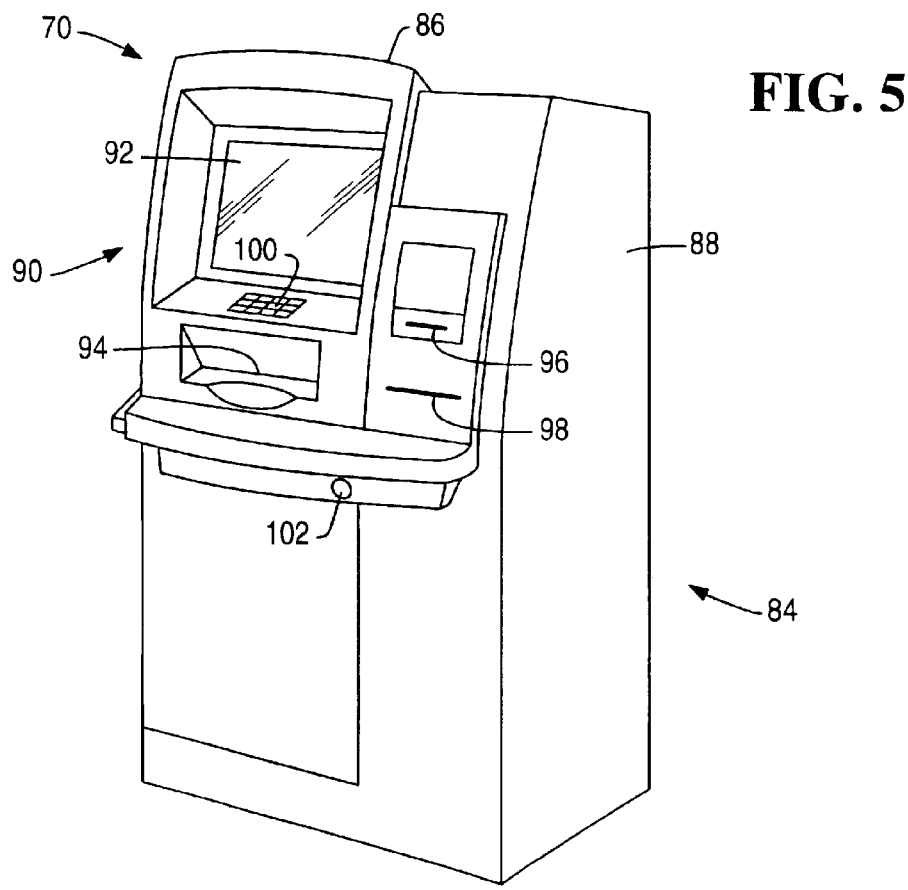
FIG. 5 is a perspective view of an SST including the module of FIGS. 1 to 4.

FIG. 5 is a perspective view of an SST 84, in the form of an ATM, including the module of FIGS. 1 to 3. The ATM 84 comprises a chassis (not shown) for supporting a fascia 86, exterior panels 88 and internal ATM modules (not shown, but including module 10). The fascia 86 incorporates a user interface 90. The fascia 86 defines a plurality of slots so that when the fascia 86 engages fully with the chassis and panels 88 the slots align with user interface elements located within the ATM 84.

The user interface 90 comprises a display 92, a cash dispense slot 94, a card entry/exit slot 96 (herein referred to as a card entry slot), a receipt slot 98, and an encrypting keypad 100.

The fascia 86 has a lock mechanism 102 for securing the fascia 86 to, and for releasing the fascia 86 from, the chassis and panels 88.

Referring to FIGS. 1 to 5, the operation of the ATM 84 is as follows.

Figure 6:
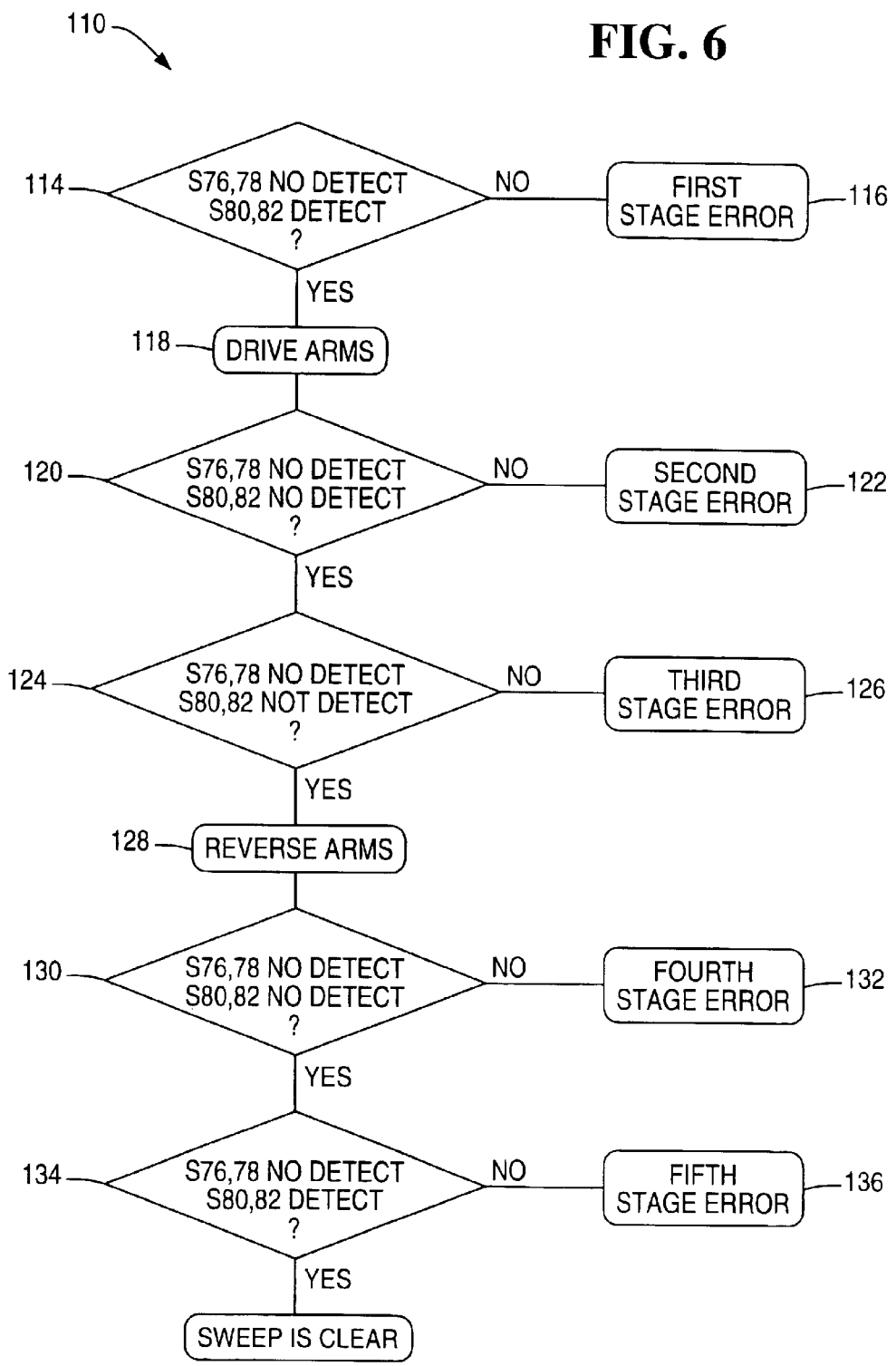
FIG. 6 is a flowchart illustrating the steps involved in a sensor detect procedure performed by the module of FIGS. 1 to 4.

When no card is present in the module 10, the module 10 periodically (for example, once every hour) performs a pre-insertion sweep 110 (FIG. 6) that involves a sensor detect procedure. The steps involved in this sweep 110 are shown in FIG. 6.

Initially (step 114), the module 10 ensures that sensors 80 and 82 detect the presence of the hook portions 68a,b respectively. This ensures that the hook portions are not damaged. If the sensors 80 and 82 do not detect the hook portions 68a,b then a first stage error signal is generated (step 116).

Figure 7A:
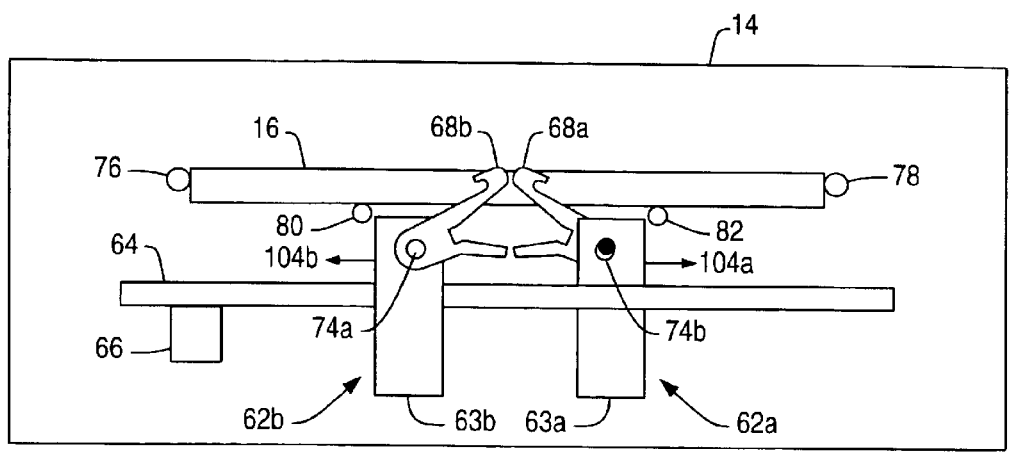
FIGS. 7a and 7b are simplified schematic rear views of part of the module of FIGS. 1 to 4 during a sweep operation.

If the sensors 80 and 82 detect the hook portions 68a,b then the module 10 activates the sweeping mechanism 28 by energizing the motor 66 to drive the arms 62a,b (step 118). This causes the arms 62a,b to traverse the width of the slot 16 in opposite directions, as illustrated in FIG. 7a, by the directions of arrows 104a,b.

As the arms 62a,b move laterally, the hook portions 68a,b are biased upwards as the lower cam surfaces 72a,b (FIG. 4) are urged against the pins 74a,b by springs 69 (FIG. 4). When the lower cam surfaces 72a,b move beyond the pins 74a,b (due to the movement of arms 62) then the hook portions 68a,b are biased to the top of the slot 16 by springs 69 (FIG. 4), as shown in FIG. 7a.

When hook portion 68a passes sensor 82, and when hook portion 68b passes sensor 80, each of these sensors 80,82 momentarily detects the respective hook portion 68. However, this detection by the sensors 80,82 is not acted on in the pre-insertion sweep 110. Except for this momentary detection of the hook portions 68a,b as they pass sensors 80,82, sensors 80 and 82 should not detect any hook portions 68a,b, and sensors 76 and 78 should not detect any hook portions 68a,b (step 120). If this does not occur, then a second stage error is generated (step 122).

Figure 7B:
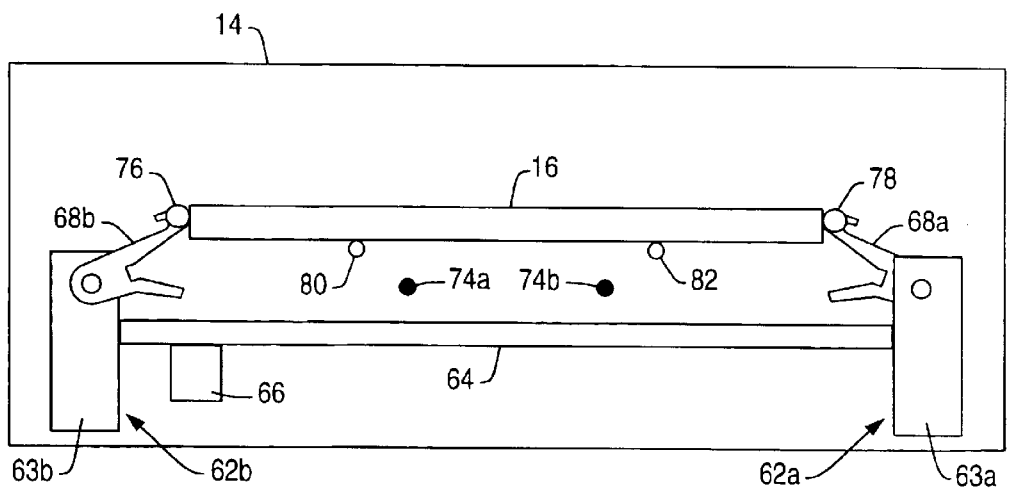

When arm 62a reaches the end of the slot 16, as shown in FIG. 7b, hook portion 68a reaches sensor 78, and hook portion 68b reaches sensor 76. When this happens sensors 76 and 78 should detect the respective hook portions 68b,a; but sensors 80 and 82 should not detect any hook portions 68a,b (step 124).

If this does not occur, then a third stage error is generated (step 126).

The direction of arms 62a,b is then reversed (step 128) by reversing the direction of rotation of stepper motor 66.

When hook portion 68a passes sensor 82, and when hook portion 68b passes sensor 80, each of these sensors 80,82 momentarily detects the respective hook portion 68. However, this detection by the sensors 80,82 is not acted on in the pre-insertion sweep 110. Except for this momentary detection of the hook portions 68a,b as they pass sensors 80,82, sensors 80 and 82 should not detect any hook portions 68a,b, and sensors 76 and 78 should not detect any hook portions 68a,b (step 130). If this does not occur, then a fourth stage error is generated (step 132).

Figure 4A:
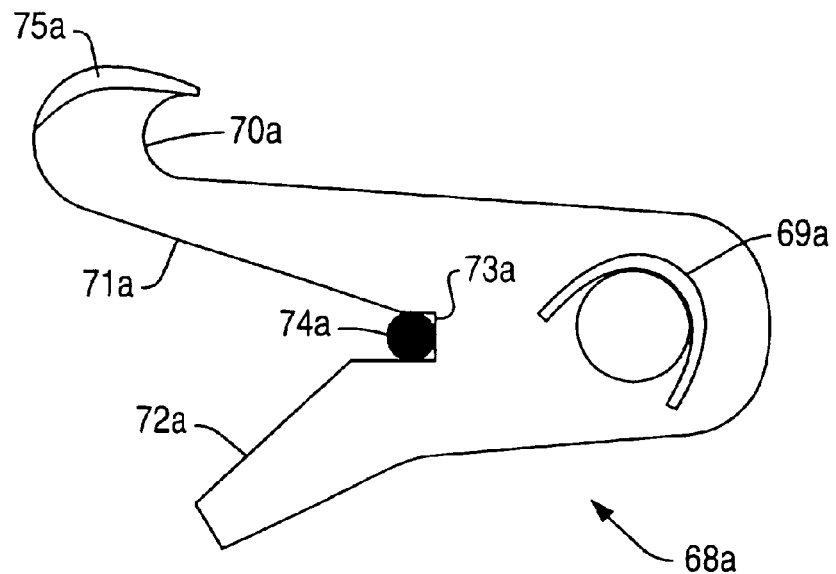
FIGS. 4a and 4b are simplified schematic side views showing the hook portion of FIGS. 3a and 3b in more detail.
Figure 4B:
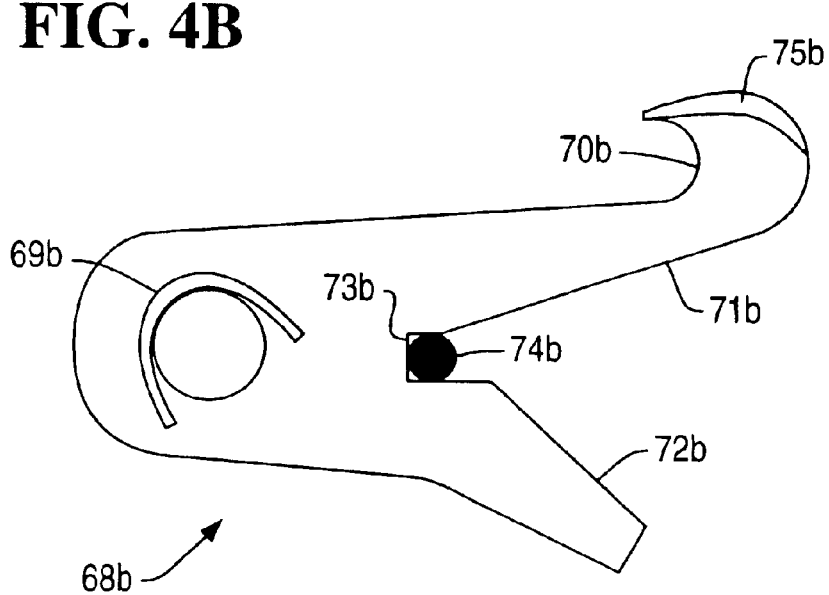

When arm 62a approaches its original starting position (shown in FIG. 3a) then the lower cam surface 72a (FIG. 4a) engages with the pin 74a, and the pin 74a urges the hook portion 68a downwards, until pin 74a fully engages with the pin retention slot 73a (as shown in FIG. 4a). Similarly, when arm 62b approaches its original starting position (shown in FIG. 3a) then the lower cam surface 72b (FIG. 4b) engages with the pin 74b, and the pin 74b urges the hook portion 68b downwards, until pin 74b fully engages with the pin retention slot 73b (as shown in FIG. 4b).

When the arms 62 complete the traverse of the width of the slot 16 and are in their original position, the driving mechanism (64,66) is halted. With the arms in their original positions, sensors 76 and 78 should not detect hook portions 68a,b; but sensors 80 and 82 should detect hook portions 68a,b (step 134).

If this does not occur, then a fifth stage error is generated (step 136), otherwise the pre-insertion sweep indicates that the slot 16 is clear of any obstructions (step 138).

If no errors were generated, then this indicates that either no obstructions were present, or that any obstruction present (such as a thin material) was caught by one of the hook portions 68a,b and either moved to the side of the throat portion 14 or cut by one of the blades 70a,b. In either event, the card reader module 10 is able to receive a user's card.

If an error was generated then appropriate action is taken by the module 10 and/or by an ATM controller (not shown) that controls the operation of the ATM 84. The module 10 may de-activate itself and indicate that an error has occurred during the traverse of the slot 16. The ATM controller may then alert a service center so that a service engineer is called.

A first stage error (step 116) may indicate that a hook portion may be damaged or broken, or one of the sensors may be malfunctioning.

A second (step 122) or fourth (step 132) stage error may indicate that one of more of the sensors may be malfunctioning.

A third (step 126) stage error may indicate that a hook portion may be damaged or broken, or one of the sensors may be malfunctioning.

A fifth stage error (step 136) may indicate that a hook portion 68a,b may have been damaged or broken by traversing the width of the slot 16. This might indicate that:

1. an obstruction is present that caused the hook portion 68a,b to be damaged; and/or
2. an obstruction is present that prevents one or both of the arms from reaching the sensors 72 or 76; and/or
3. one or more of the sensors has malfunctioned during the sweep across the slot 16.

If no errors have been generated then the module 10 remains activated so that a user may insert a card.

Referring now to FIGS. 1 to 5 and FIGS. 8a and 8b, when a user enters his/her card 106, the card 106 enters throat slot 16; deflects arm 22, thereby opening the shutter 18; enters the housing 12; is pinched by first rollers 32; and is drawn into housing 12. The card 78 is then driven back out of the housing 12 so that the card 78 protrudes from the card entry slot 96 by a small distance (for example, 1 cm). However, the card 106 still protrudes through slot 16.

Figure 9:
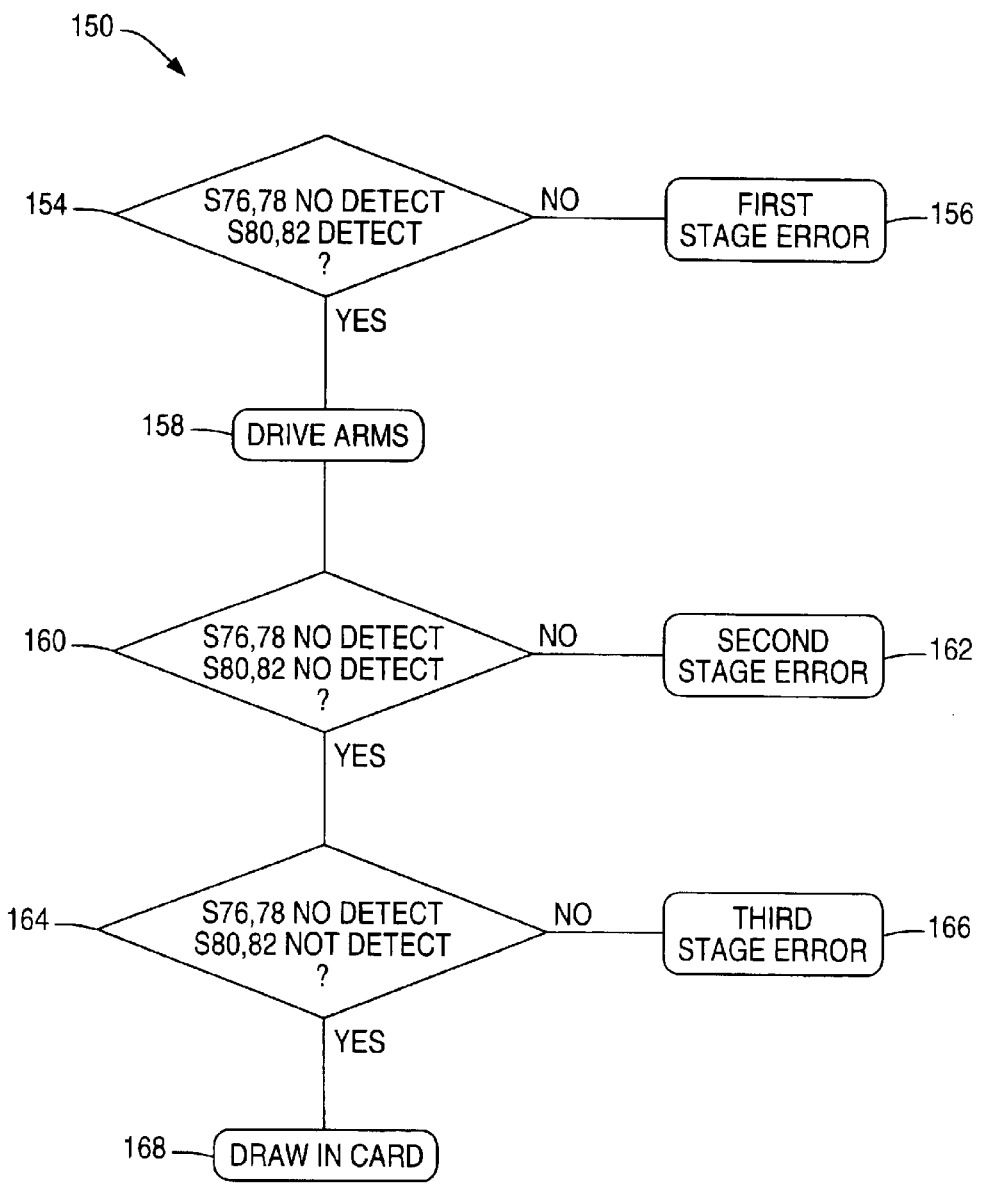
FIG. 9 is a flowchart illustrating the steps involved in a sensor detect procedure performed by the module of FIGS. 1 to 4 during insertion of a card.

Module 10 then performs a card insertion sweep 150 (see FIG. 9). In card insertion sweep 150, step 154 is identical to step 114 in the pre-insertion sweep 110. However, if an error is detected at this stage (step 156) then the user is invited to remove the card.

Figure 8A:
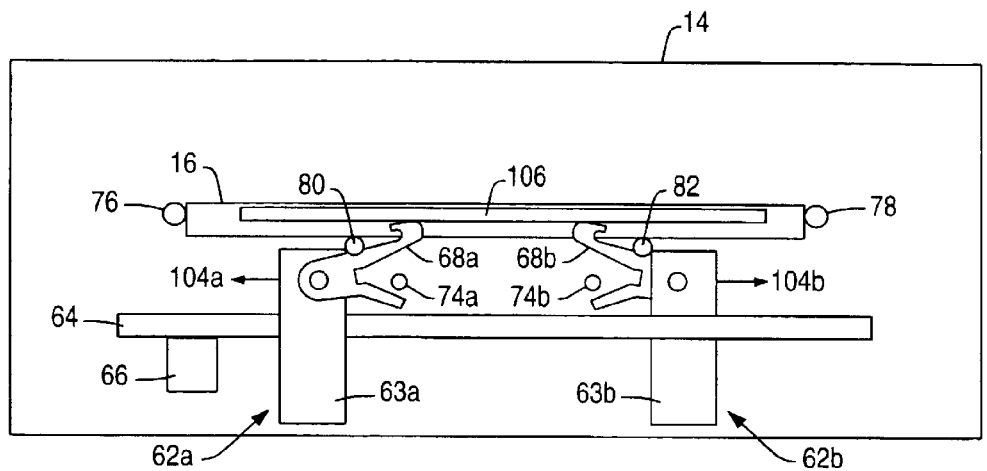
FIGS. 8a and 8b are simplified schematic rear views of part of the module of FIGS. 1 to 4 during a sweep operation with a card present.
Figure 8B:
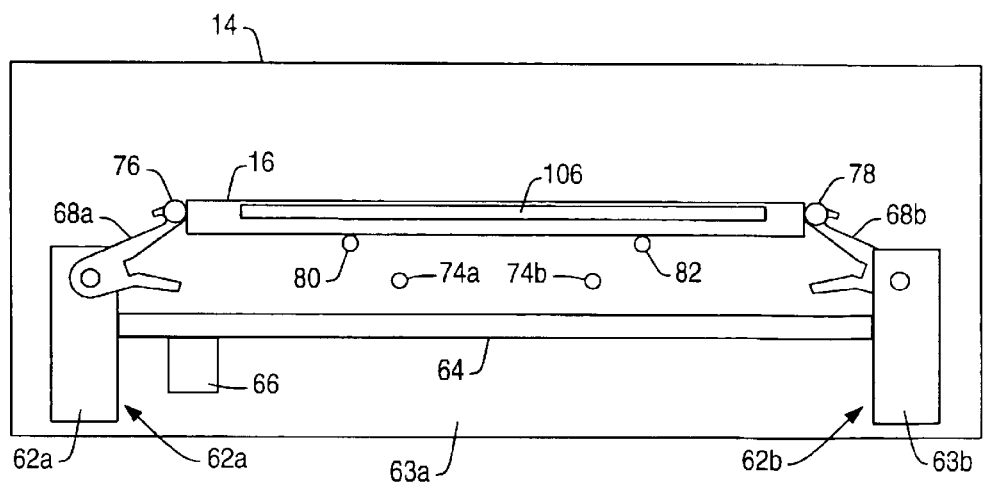

The arms 62 are then driven in the same way as described for sweep 110. When card 106 is protruding through slot 16, material 75a,b (FIG. 4) on the top of hook portions 68 is urged against an underside of the card 106, as shown in FIG. 8a, until the hook portions 68 move beyond the sides of the card 106 The hook portions 68 are then urged to the top of the slot 16.

Step 160 is identical to step 120 in sweep 110. However, if an error is detected at this stage (step 162) then the user is invited to remove his/her card.

Step 164 is identical to step 124 in sweep 110. However, if an error is detected at this stage (step 166) then the user is invited to remove his/her card.

If no errors have occurred up to this point in the procedure, then driving mechanism is halted so that the arms 62 remain at either side of the slot 16. The user's card 106 is then drawn (step 168) into the housing 12 and the card read operation proceeds as for conventional card readers.

Figure 10:
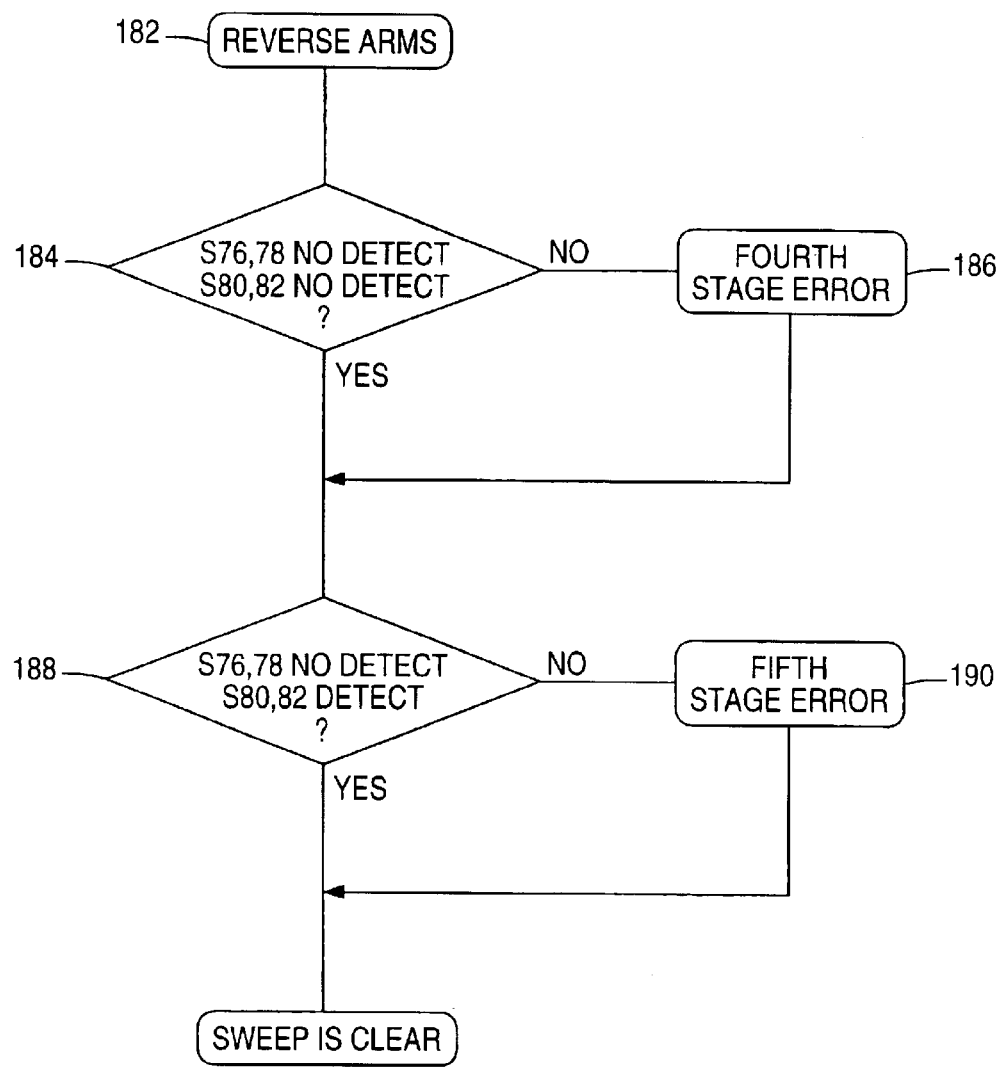
FIG. 10 is a flowchart illustrating the steps involved in a sensor detect procedure performed by the module of FIGS. 1 to 4 immediately prior to ejecting a card.

Once the user has completed his/her chosen transaction at the ATM 84, then the card 106 is staged for ejection. At this point, the arms 62a,b are located at opposite sides of the slot 16. A card ejection sweep 180 (FIG. 10) is then performed.

The arms 62 are driven back to their original position near the center of the throat portion 14 (step 182), which involves the driving mechanism 64,66 moving the arms 62 in the opposite direction to the movement in the card insertion sweep 150 (in step 158 of FIG. 9).

Step 184 is identical to step 130 in sweep 110. However, if an error is detected at this stage (step 186) then the module 10 continues with the procedure but activates an alert signal.

Step 188 is identical to step 134 in sweep 110, However, if an error is detected at this stage (step 190) then the module 10 activates an alert signal but still attempts to eject the card.

The ATM 84 may inactivate the card reader module 10 if an alert signal is activated (such as in steps 186 or 190). This would have the effect of stopping the card reader module 10 from attempting to eject the card 106.

Even if the card is successfully ejected, however, the ATM 84 may de-activate the module 10 and may not allow any subsequent users to insert their cards until a service engineer has examined the module 10 and removed any obstruction that may be present. If this occurs, then the ATM informs a service center that it is out of operation due to possible fraud, and a service engineer is called to remove the material and the card (if still present) so that the ATM 84 is restored to working order.

If the card 106 cannot be ejected then the ATM 84 displays a message on the display 92 informing the user that the card 106 has been retained. The display 92 may also provide details of how the user may apply for the card back or for a new card.

Figure 11A:
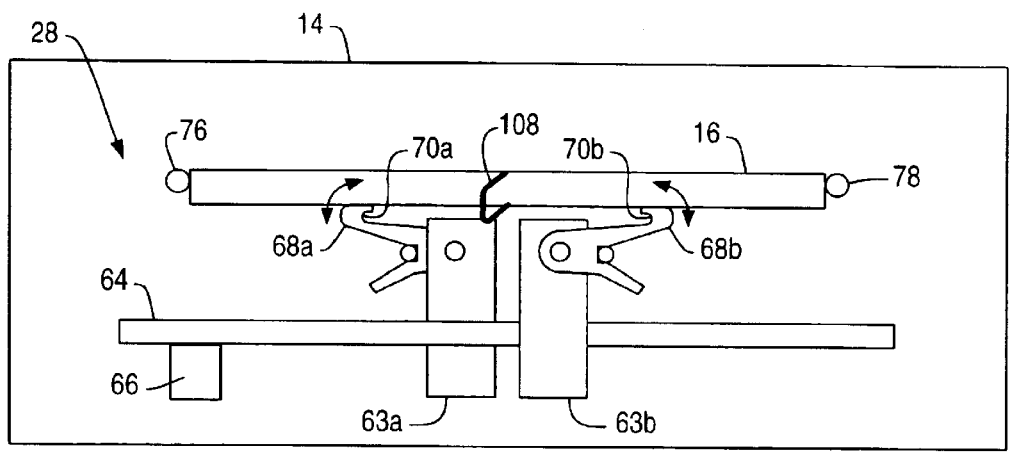
FIGS. 11a and 11b are simplified schematic rear views of part of the module of FIGS. 1 to 4 during a sweep operation with a loop of material present.

FIG. 11a illustrates a loop of thin, strong, material 108 located in the slot 16 to trap a card, with the arms 62a,b in the original (inactivated) position.

Figure 11B:
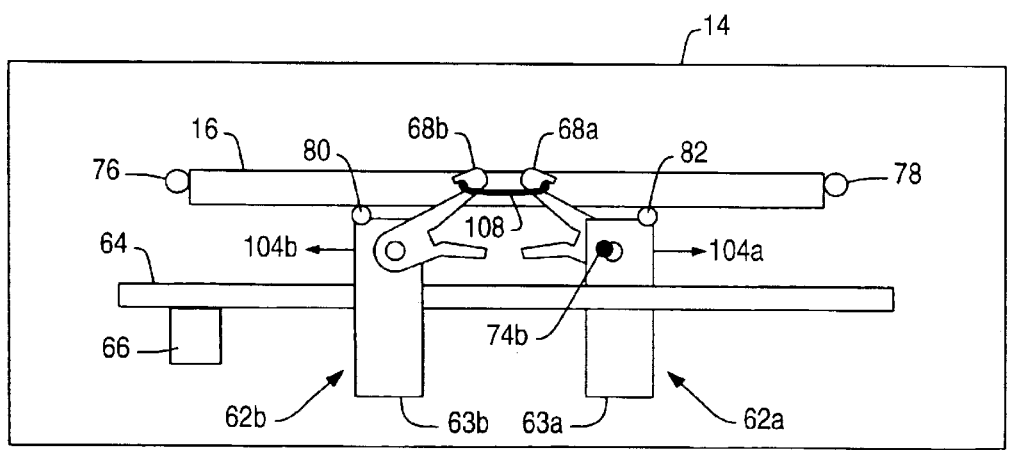

FIG. 11b illustrates the material 108 being pulled apart by the arms 62a,b during a sweep procedure. As the arms 62a,b continue moving away from each other, the thin material 108 will be cut by the blades 70a,b in the arms 62. Once the thin material 108 has been cut, the fraud is prevented and a transaction can be performed without requiring a service engineer to be called.

It will now be appreciated that this embodiment has a number of advantages. It can obviate attempted fraud by cutting or permanently displacing an obstruction. If the attempted fraud cannot be obviated then it can de-activate the module, thereby preventing any more fraud. It is able to detect potential fraud prior to a user inserting a card. It is not visible to members of the public, thereby reducing the possibility of attack to compromise the performance of the sweep mechanism. It is located behind the card reader shutter, thereby providing additional security.

Various modifications may be made to the above described embodiment within the scope of the invention, for example, the motorized card reader may be a Smart card reader or a combined Smart card and magnetic card reader and/or a reader/writer. In other embodiments, a different number of sensors for detecting the sweeping mechanism may be used than that described in the specific embodiment. In other embodiments, each arm may have two hook portions, one on each side of the arm, so that each arm could catch an obstruction when moving in either direction. In other embodiments, the arms may only make a single traverse, they may not be returned to their starting point. Thus, the next sweep would involve each arm moving in an opposite direction to that of the previous sweep.

In another embodiment, the drive mechanism may be implemented by a pulley and wire arrangement, where a pulley is located at each side of the slot in the throat portion, and a length of wire loops round the two pulleys A stepper motor is used to drive one of the pulleys, and one or more arms are coupled to the wire so that as the pulleys rotate the arm(s) traverse the width of the slot. The direction of movement of the arm(s) can be changed by reversing the rotation of the stepper motor.

The self-service terminal may be a non-cash kiosk. In other embodiments, a different MCRW modules than that described may be used, for example, an MCRW module manufactured by Omron (trade mark).

What is claimed is:

1. A motorized card reader module comprising:

a throat portion for receiving cards;

a housing portion for containing a card read head;

a shutter arm movable from a closed position to an open position to allow a card to pass from the throat portion to the housing portion; and a sweeping arm movable from one side of the throat portion to an opposite side of the throat portion to detect any non-card obstruction in the throat portion as the sweeping arm traverses a substantially entire width of the throat portion;

the sweeping arm including a hook portion having a recessed area for enabling the hook portion to (i) catch a non-card obstruction, (ii) maintain the caught non-card obstruction within the recessed area, and (iii) drag the caught non-card obstruction to a side of the throat portion when the sweeping arm moves from the one side of the throat portion to the other side of the throat portion.

2. A module according to claim 1, further comprising a resilient bias for biasing the hook portion so that the hook portion remains in contact with a card when the hook portion is deflected by the card.

3. A self-service terminal comprising:

a fascia defining a card entry/exit slot; and a motorized card reader module in registration with the card entry/exit slot and including (i) a throat portion for receiving cards, (ii) a housing portion for containing a card read head, (iii) a shutter arm movable from a closed position to an open position to allow a card to pass from the throat portion to the housing portion, and (iv) a sweeping arm movable from one side of the throat portion to an opposite side of the throat portion to detect any non-card obstruction in the throat portion as the sweeping arm traverses a substantially entire width of the throat portion;

the sweeping arm including a hook portion having a recessed area for enabling the hook portion to (i) catch a non-card obstruction, (ii) maintain the caught non-card obstruction within the recessed area, and (iii) drag the caught non-card obstruction to a side of the throat portion when the sweeping arm moves from the one side of the throat portion to the other side of the throat portion.

4. A self-service terminal according to claim 3, further comprising sensor means for (i) detecting when the sweeping arm is located at the one side of the card entry/exit slot, and (ii) detecting when the sweeping arm is located at the opposite side of the card entry/exit slot.

5. A method of operating a motorized card reader to remove a non-card obstruction from a throat portion of the reader, the method comprising:

moving a sweeping arm from a first side of the throat portion of the card reader to a second side of the throat portion opposite to the first side;

catching a non-card obstruction in a recessed area defined by a hook portion of the sweeping arm; and dragging the caught non-card obstruction to the second side of the throat portion while maintaining the non-card obstruction within the recessed area so that a card can be inserted into the throat portion without being impeded by the non-card obstruction.

6. A method of operating a motorized card reader to detect a non-card obstruction in a throat portion of the reader while a card is present in the throat portion of the reader, the method comprising:

moving a sweeping arm from a first side of the throat portion, beneath a card protruding through the throat portion, to a second side of the throat portion opposite to the first side of the throat portion;

catching a non-card obstruction in a recessed area defined by a hook portion on the sweeping arm; and dragging the caught non-card obstruction to the second side of the throat portion to allow the protruding card to be transported through the throat portion without being impeded by the non-card obstruction.

7. A motorized card reader module comprising:

means defining a throat portion for receiving cards;

means defining a housing portion for containing a card read head;

a shutter arm member movable from a closed position to an open position to allow a card to pass from the throat portion to the housing portion; and a sweeping arm member including surface means defining a predefined recessed surface for engaging a non-card obstruction in the throat portion to drag the non-card obstruction from one side of the throat portion to an opposite side of the throat portion as the sweeping arm member moves from the one side of the throat portion to the opposite side of the throat portion.

8. A motorized card reader according to claim 7, wherein the predefined recessed surface comprises a substantially J-shaped surface for catching the non-card obstruction in the throat portion when the non-card obstruction is engaged.

9. A motorized card reader according to claim 8, wherein the substantially J-shaped surface includes means defining a blade portion for cutting the non-card obstruction in the throat portion as the sweeping arm member moves from the one side of the throat portion to the opposite side of the throat portion.

10. A motorized card reader module comprising:

a throat portion for receiving cards;

a housing portion for containing a card read head;

a shutter arm movable from a closed position to an open position to allow a card to pass from the throat portion to the housing portion; and a sweeping arm movable from one side of the throat portion to an opposite side of the throat portion to detect any non-card obstruction in the throat portion as the sweeping arm traverses a substantially entire width of the throat portion;

the sweeping arm including a hook portion having a recessed area for enabling the hook portion to (i) catch a non-card obstruction, (ii) maintain the caught non-card obstruction within the recessed area, and (iii) drag the caught non-card obstruction to a side of the throat portion when the sweeping arm moves from the one side of the throat portion to the other side of the throat portion;

wherein the hook portion includes a cutting mechanism for cutting a non-card obstruction in the throat portion.

11. A module according to claim 10, further comprising a first sensor for detecting when the sweeping arm is moved to the one side of the throat portion.

12. A module according to claim 11, further comprising a second sensor for detecting when the sweeping arm is moved to the opposite side of the throat portion.

13. A module according to claim 11, wherein the first sensor is located to detect if the cutting mechanism is damaged.

* * * * *